United States Patent [19]

Waltz

[11] Patent Number: 4,757,425
[45] Date of Patent: Jul. 12, 1988

[54] PHOTOGRAPHIC LIGHT DIFFUSER

[75] Inventor: Thomas A. Waltz, Toledo, Ohio

[73] Assignee: The F. J. Westcott Co., Toledo, Ohio

[21] Appl. No.: 801,217

[22] Filed: Nov. 25, 1985

[51] Int. Cl.⁴ .............................................. G03B 15/02
[52] U.S. Cl. ...................................... 362/18; 362/311; 362/450
[58] Field of Search ..................... 362/3, 18, 102, 310, 362/311, 352, 355, 17, 431, 450, 358, 319

[56] References Cited

U.S. PATENT DOCUMENTS

| | | |
|---|---|---|
| 923,542 | 6/1909 | Losey . |
| 2,105,225 | 8/1936 | Pollock . |
| 2,193,485 | 3/1940 | Kenning ............................... 362/18 |
| 2,205,860 | 6/1940 | Olds ..................................... 362/18 |
| 2,794,906 | 6/1957 | Edgerton . |
| 3,294,962 | 12/1966 | Hilzen . |
| 3,429,320 | 2/1969 | Edelkind . |
| 3,781,535 | 12/1973 | Larson . |
| 3,851,164 | 11/1974 | Intrator . |
| 3,870,874 | 3/1975 | Larson . |
| 3,873,821 | 3/1975 | Larson . |
| 3,939,340 | 2/1976 | Gozzano et al. .................... 362/352 |
| 4,187,531 | 2/1980 | Lowell et al. . |
| 4,428,030 | 1/1984 | Baliozian ............................ 362/352 |
| 4,443,837 | 4/1984 | Migliori et al. . |
| 4,446,506 | 5/1984 | Larson . |
| 4,464,708 | 8/1984 | Nüssli et al. . |
| 4,594,645 | 6/1986 | Terashita ............................. 362/352 |
| 4,633,374 | 12/1986 | Waltz et al. ......................... 362/17 |

Primary Examiner—Charles J. Myhre
Assistant Examiner—David A. Okonsky
Attorney, Agent, or Firm—Emch, Schaffer, Schaub & Porcello Co.

[57] ABSTRACT

A photographic light diffuser is disclosed having a support rod and collapsible frame with a plurality of ribs and stretchers. The frame in the open position defines an opening that is substantially square or rectangular. The frame is covered by a reflective panel and a translucent panel is connected to the reflective panel and positioned over the opening defined by the frame to define an enclosed chamber for receiving a light source. Access to the interior of the enclosed chamber is provided by one or more closeable openings.

35 Claims, 3 Drawing Sheets

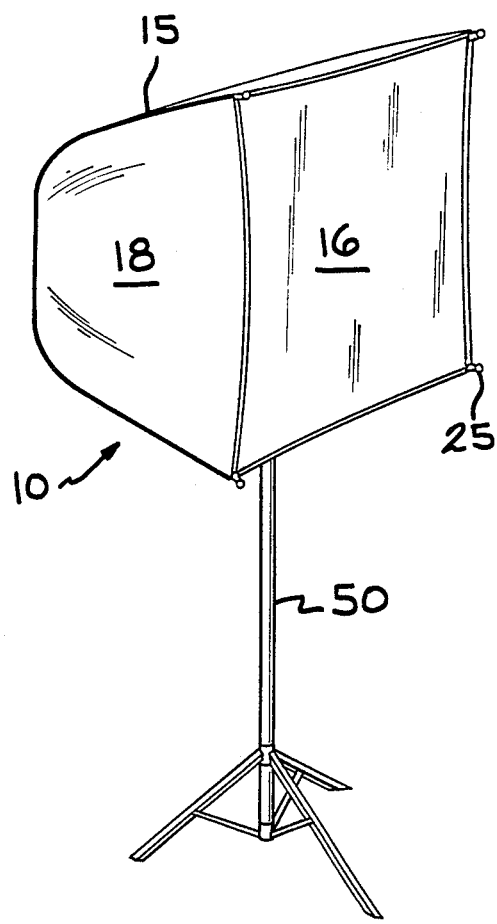
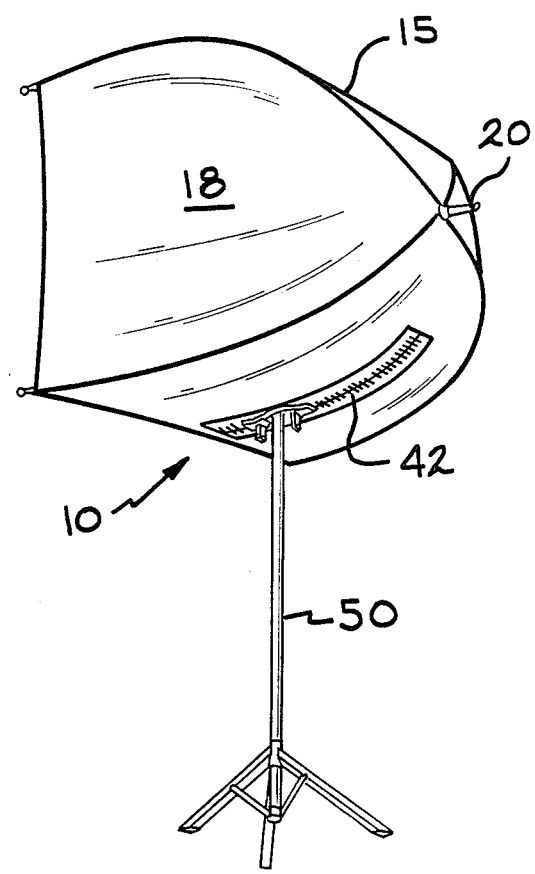
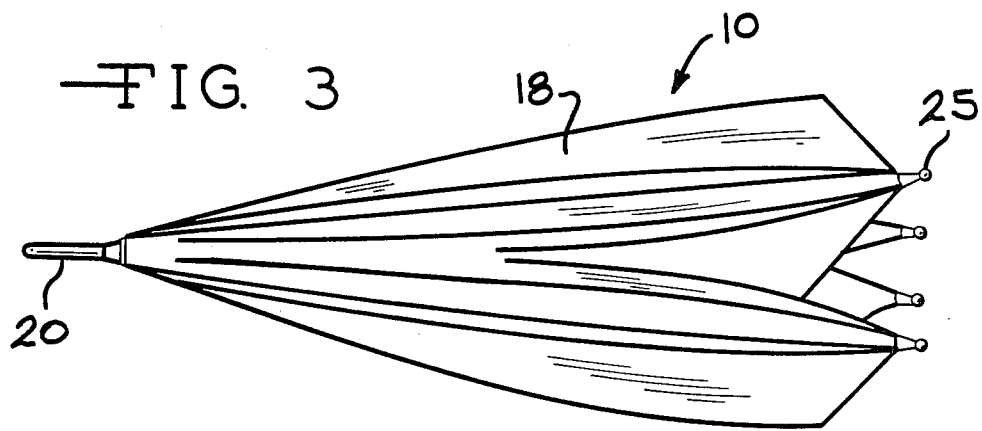
FIG. 1
FIG. 2
FIG. 3

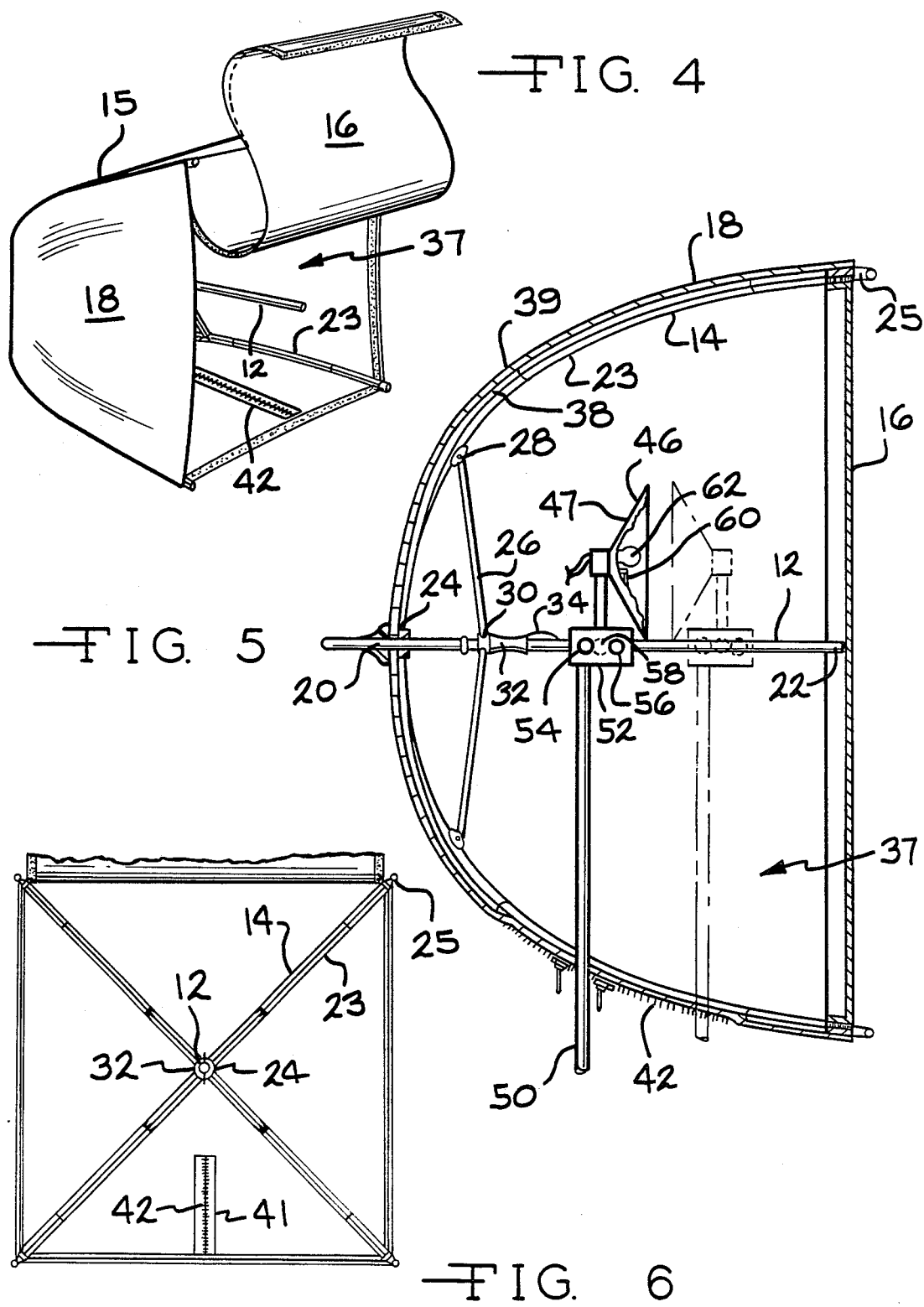

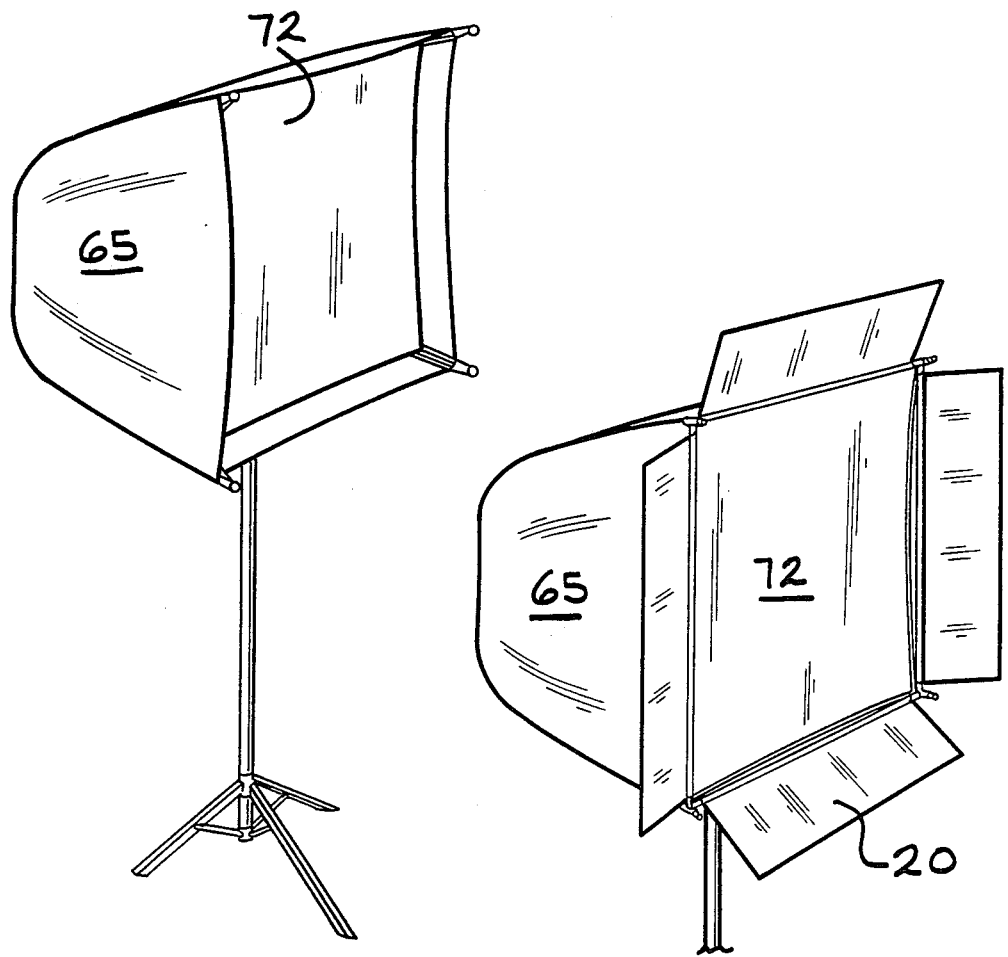
FIG. 7
FIG. 9
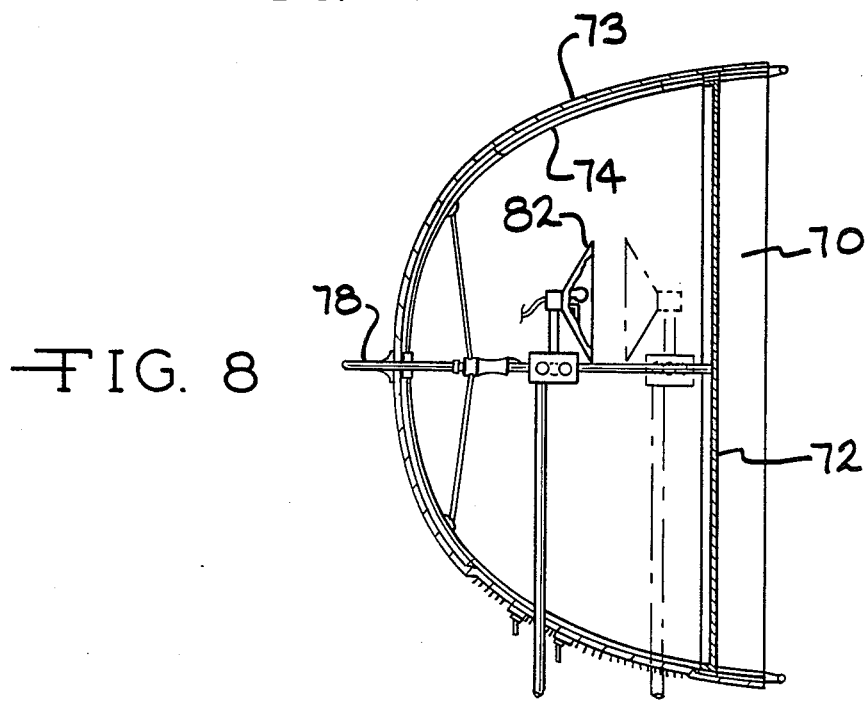
FIG. 8

PHOTOGRAPHIC LIGHT DIFFUSER

BACKGROUND OF THE INVENTION

The present invention relates to a light diffuser for use with light sources in photography. Diffused or indirect lighting is used in both still and motion picture type photography. To achieve an indirect, soft type lighting effect it is desirable to first either directly or indirectly pass the light through a semi-transparent material to break up and diffuse the light rays. Such lighting is generally produced by light sources which are remote from the camera.

Each particular area to be lighted will dictate the type and intensity of light that will be needed. In some situations direct light from the light source without any alteration may be required. In other situations direct light may be too strong or cast overly distinct shadows in which case a more diffuse light will be more desirable. In still other cases an even more indirect diffuse light may be needed to create the proper lighting effect. It is also important to have a great deal of uniformity in the lighting to assist the photographer in properly lighting the subject. The light diffuser should also be capable of being used with almost any type of light source and mounting bracket for the light source. It is also desirable to have a light diffuser that is a compact, self-contained unit that is easy to position and use.

It is therefore an object of the present invention to provide a photographic light diffuser which will give varying degrees of diffused lighting.

It is another object of the present invention to provide a photographic light diffuser that will yield such lighting through a device that is lightweight, compact and easily transported and stored.

It is a further object of the present invention to provide a photographic light diffuser that is useable with a wide variety of light sources.

Other objects and advantages of the present invention will become more apparent from a further review of the following specification, drawings and claims.

SUMMARY OF THE INVENTION

The present invention relates to a photographic light diffuser for use in conjunction with a light source to provide various types of diffused light for photographic purposes. The diffuser has a support rod with a first end and a second end. Connected to the first end of the support rod is a collapsible frame structure which when opened extends radially away from the support rod to form a substantially parabolic shaped frame structure. In the open position the frame defines a substantially square or rectangular opening.

The frame consists of a plurality of ribs pivotally connected to the first end of the support rod. Connected at substantially the midpoint of the ribs are a corresponding plurality of stretchers whose opposite ends are pivotally and slideably connected to a runner slidably positioned about the support rod. The frame is kept in the open position by a releasable lock mechanism in the support rod which prevents the runner from retracting once the frame has been expanded radially outward.

The ribs of the frame are covered by a reflective panel with a reflective silver color interior and a black exterior. A translucent panel of white nylon or other suitable material is positioned to cover the opening defined by the frame. The translucent panel can be releasably secured to the reflective panel. A closeable opening is provided in the reflective panel to provide access to the interior of the diffuser for mounting a light source.

The light source mounted inside the diffuser can either be aimed directly at the translucent panel or first reflected off the reflective panel to diffuse the light even more before it passes through the translucent panel.

BRIEF DESCRIPTION OF THE DRAWINGS

FIG. 1 is a perspective side view of a photographic light diffuser mounted on a floor stand according to the present invention.

FIG. 2 is a perspective rear view of a photographic light diffuser mounted on a floor stand according to the present invention.

FIG. 3 is a side view of a photographic light diffuser in the collapsed position according to the present invention.

FIG. 4 is a partial perspective side view of a photographic light diffuser with the translucent panel partially removed from the reflective panel.

FIG. 5 is a cross-sectional side view of a photographic light diffuser, with a light source mounted on the support rod of the light diffuser.

FIG. 6 is a front view of the light diffuser with the translucent panel partially removed from the reflective panel.

FIG. 7 is a perspective view of another embodiment of the photographic light diffuser of the present invention.

FIG. 8 is a perspective view of the photographic light diffuser shown in FIG. 7.

FIG. 9 is a cross-sectional view of the photographic light diffuser of FIG. 8.

DESCRIPTION OF THE PREFERRED EMBODIMENT

The present invention relates to photographic light diffuser 10 as shown in the attached figures. The diffuser 10 generally consists of a support rod 12, a frame assembly 14 and a cover 15. The cover has a translucent panel 16 and a reflective panel 18.

The support rod 12 has a first end 20 and a second end 22 and serves to support the frame assembly 14. The frame assembly 14 is connected to the first end 20 of the support rod 12 and forms a substantially parabolic shaped structure around the support rod 12. The frame assembly 14 can be in a closed position as shown in FIG. 3 or in an open position as shown in FIGS. 1 and 2. When the frame 14 is in the open position it defines an opening around the support rod 12. Normally the opening defined by the frame 14 is substantially square or rectangular and the second end 22 of the support rod 12 is located at substantially the plane defined by the opening and the second end 22 is positioned in substantially the center of the opening. The frame assembly 14 is comprised of a plurality of ribs 23 having a first end 24 and a second end 25. The first ends 24 of the ribs 23 are pivotally connected to the first end 20 of the support rod 12. A corresponding plurality of stretchers 26 are connected to the ribs 23. Each of the stretchers 26 has a first end 28 and a second end 30. The first ends 28 of the stretchers 26 are pivotally connected to ribs 23 and substantially the midpoint of the ribs 23. The second end 30 of the stretchers 26 are pivotally and slideably connected to the support rod 12 by a runner 32 that is slideably positioned on the support rod 12. The runner 32 can be advanced along the support rod 12 to move the stretchers to a position where the collapsible frame 14 is in an open position. In the open position the second ends 25 of the ribs 23 are radially spaced apart from the support rod 12 and define a substantially parabolic shaped structure. The second ends 25 of the ribs 23 also define a substantially square or rectangular opening around the support rod 12.

To maintain the frame 14 in an open position a retractable lock mechanism 34, as typically found on umbrellas is positioned within and extends from the support rod 12 near its first end 20. When the frame 14 is moved from a closed position, as shown in FIG. 3, to an open position, the runner 32 is advanced along the support rod 12 in a directions towards the first end 20. The lock mechanism 34 retracts into the rod 12 as the runner 32 passes over the lock mechanism. Once the runner has completely passed the lock mechanism 34, the lock mechanism extends from the support rod 12 and engages the runner 32. The lock mechanism 34 thereby holds the runner 32 in this position on the support rod and retains the frame assembly 14 in the open position. To close the frame assembly 14, the lock mechanism is depressed into the support rod 12 and this allows the runner 32 to be advanced in a direction towards the second end 22 of the support rod 12.

The frame 14 is covered with a reflective panel 18. The reflective panel contains a tip cap 36 that is disposed for receiving the first end 20 of the support 12. The tip cap 36 acts to attach the reflective panel to the support rod 12. The outer periphery of the reflective panel 18 is fastened to the second end 25 of each of the ribs 23. The reflective panel 18 is supported by the ribs 23 of the frame 14 and the ribs hold the reflective panel in a substantially parabolic shape. The tip cap 36 is disposed in substantially the center of the reflective panel 18. The reflective panel 18 substantially covers the substantially parabolic shaped frame 14. The interior surface 38 of the reflective panel 18 is reflective. Silver colored nylon or other similarly reflective surface fabrics may be used for the interior surface 38 of the reflective panel 18. The outer surface 39 of the reflective panel 18 is black or another dark color to retard light transmission through the reflective panel 18.

The substantially square or rectangular opening defined by the frame 14 is covered with a translucent fabric panel 16 such as white nylon or other suitably translucent material. The translucent panel 16 is normally sewn to one side of the substantially square or retangular opening. The other sides of the translucent panel 16 are provided with a releasable attachment means 40 to secure the other three edges of the translucent panel 16 to the surfaces of the reflective panel 18 adjacent the opening defined by the frame 14. Velcro or other suitable releasable attachment means can be used to secure the translucent panel 16 to the reflective panel 18. It should also be noted that the releasable attachment means 40 can be used on all sides of the translucent panel 16 so that any side of the translucent panel can be removed from the reflective panel and so that the entire translucent panel 16 can be removed from engagement with reflective panel and removed from the opening defined by the frame 14. When the translucent panel 16 is positioned over the opening defined by the frame 14, the diffuser 10 forms an enclosed chamber 37. The second end 22 of the support rod 12 is positioned adjacent the translucent panel and within the enclosed chamber 37.

Access to the interior of the enclosed chamber 37 of the diffuser 10 is provided by one or more closeably openings 41 positioned in the reflective panel 18 of the cover 15. The closeably opening 41 normally extends from the substantially square opening defined by the frame 14 along the reflective panel 18 in a direction towards the first end 20 of the support rod 12. The closeable opening 41 normally extends at least one-half the distance from the opening defined by the frame 14 to the point where the first end 20 of the support rod 12 passes through the reflective panel 18. The opening 41 is also normally disposed to be substantially parallel to the support rod 12. However, it should be recognized that an opening 41 of almost any length and position can be used in the reflective panel 18 as long as the opening should be sufficiently large to allow the insertion of a hooded light source 46 such as shown in FIG. 5. The closeable opening 41 provides access to the interior of the diffuser 10 and allows the diffuser to be positioned in almost any desired angular position on a standard support stand 50 that is used to support the hood light source 46. It has been found that a zipper 42 works particularly well as the closing means for the closeable opening 41. In particular, a zipper that is closeably from each end is useful as this allows the opening 41 to be closed around the support stand 50 regardless of where the support stand 50 is positioned in the opening 41.

When the diffuser 10 is in the collapsed position, it resembles the configuration shown in FIG. 3. In the collapsed position the ribs 23 and the stretchers 26 of the frame 14 are positioned adjacent the support rod 12. The reflective panel 18 and the translucent panel 16 of the cover 15 can also be folded to be substantially adjacent the support rod 12 to provide a compact unit for easy storage and transportation.

To open the diffuser 10 from the collapsed position shown in FIG. 3, the runner 32 is advanced along the support rod 12 in a direction towards the first end 20 of the support rod. As the runner 32 is advanced, the ribs 23 and stretchers 26 of the frame 14 extend radially away from the support rod 12 to form a substantially parabolic shaped frame configuration. In the open position the translucent fabric panel 16 and the reflective panel 18 are held in substantially taut position so that there is essentially no sag or loose fabric on the diffuser 10.

Referring to FIG. 5, once the diffuser 10 is in the opening position, a light source 46 can be placed within the interior chamber 37 through closeable opening 41 in the cover 15. The light source 46 can be adjustably mounted on the support rod 12. The light source can include a reflector 47 that can be used to direct the light in the desired direction. The reflector can be removable and when removed the light from the light source will not be directed in any direction. In addition, the diffuser 10 can be mounted on the support stand 50 to elevate the diffuser above the ground and allow vertical and rotational adjustment of the diffuser.

The light source 46 and the stand 50 are mounted to the support rod 12 by an adjustable mounting block 52. By loosening and retightening the frictional adjustment knobs 54, 56 and 58, the light 46 in the stand 50 can be moved back and forth along the support rod 12. In addition, both the vertical height and the rotation of the light 46 in the stand 50 can be adjusted. The adjustments can be made by reaching through closeable opening 41 or by releasing the translucent panel 16 from the reflective panel 18 and reaching into the opening formed by the frame assembly 14. After the adjustments to the light source 46 have been completed, the opening in the diffuser 10 is closed to again form an enclosed chamber 37. Closing the diffuser 10 prevents any stray light from interfering with the desired lighting affect produced by the light diffuser. The light source 46 can be equipped with either a strobe-type light 60, a conventional light bulb 62 or both types of lights. Although a mounting block 52 has been shown to mount the lighting source 46, it should be understood that almost any type of mounting bracket for a light source can be used with the diffuser of the present invention. This allows the diffuser 10 to be used almost universally with any type of mounting bracket for the light source.

Referring to FIG. 5, the light source 46 is shown aimed directly at the translucent panel 16 of the cover 15. Thus, the light from the light source 46 passes directly through the translucent panel and onto the subject that is to be photographed. This produces a stronger more localized type of diffused lighting on the subject that is to be photographed, thereby allowing the photographer to properly illuminate the intended subject matter without creating heavy well-defined shadows in the background of the picture. A larger pattern of light is emitted from the diffuser 10 as the light source 46 is moved in a direction away from the translucent panel 16 along the support rod 12. The further the light source is spaced apart from the translucent panel 16 the more the light can radially disperse to fill a larger portion of the translucent panel. Thus, the position of the light source and the diffuser 10 can be used to vary the pattern of the light emitted from the diffuser onto the subject or object to be photographed. Since the translucent panel 16 extends across the substantially square or rectangular opening defined by the frame assembly 14, a substantially square or rectangular pattern of diffused light is emitted from the diffuser 10. As the support rod 12 is the only structure that is positioned between the light source 46 and the translucent panel 16, there is almost no interference with the light that is emitted from the diffuser. Since the light source 46 is positioned in substantially the center of the diffuser 10, the intensity of the light is strongest around the center of the translucent panel 16 adjacent to the support rod 12. The intensity from the light source decreases progressively as it moves from the center of the translucent panel 16 towards the outer periphery of the translucent panel.

If a more subtle type of diffuse light is required, the user can position the light source, as shown in phantom in FIG. 5, to be directed towards the reflective panel 18. By aiming the light source 46 at the reflective panel, the light is reflected on the reflective panel 18 and then passes through the translucent front panel 18. Reflecting the light on the reflective panel 18 breaks up the light pattern from the light source 46 and results in a much softer type of light being emitted from the translucent panel 16 of the diffuser 10. Positioning the light source 46 so that the light strikes the reflective panel 18 before being emitted from the diffuser 10 allows the photographer a means for easily adjusting the effect of the light source upon the subject that is to be photographed. In this configuration a larger pattern of light is emitted from the diffuser 10 becomes larger as the light source 46 is moved in a direction towards the translucent panel 16 along the support rod 12, with the light source still directed towards the reflective panel 18.

The farther the light source is spaced apart from the reflective panel 18, the more the light can be radially dispersed to contact a larger portion of the reflective panel 18. The larger the area of the reflective panel that is filled with light, the larger the pattern of reflected light that is directed towards the translucent panel 16. Thus, the position of the light source 46 in the diffuser 10 can be used to vary the pattern of light reflected from the reflective panel 18 and the pattern of light that is emitted from the translucent panel 16 onto the object that is to be photographed. Since the opening defined by the frame assembly 14 is substantially square or rectangular, the light that is reflected from the reflective panel 18 will form a substantially square or rectangular pattern on the translucent panel 16. Thus, the light that is emitted from the diffuser 10 will be in a well-defined controlled pattern that makes it easier for the photographer to produce the desired lighting effect on the object that is to be photographed. In the reflected mode, so much light is reflected that the light substantially fills the translucent panel with light that is emitted from the diffuser. The light is reflected from so many different angles that the light source and support rod in the diffuser does not disrupt the substantially uniform level of reflected light that is emitted from the diffuser.

It is also possible to use the light source 46 without the reflector 47. In this arrangement, the light source directs light in all directions and there is both direct and reflected light that is emitted from the translucent panel. When the reflector is removed from the light source, the diffuser has its greatest output of light as there is both direct and reflected light emitted from the diffuser.

The light that is emitted from the diffuser 10 is very uniform with essentially no dark spots or shadows. This uniformity of light is present whether the light source is positioned in the direct, reflected or direct and reflected mode. The uniformity of the light makes it easier for the photographer to set up the lights to achieve the desired type of lighting on the subject that is to be photographed.

When a particular lighting session is completed, the diffuser 10 can either be removed from the light source 48 and used with another light source or simply collapsed, folded and stored until needed again. The diffuser 10 is a complete unit that is easily opened and collapsed without the use of a special tool. It is a very simple operation to open or close the diffuser and requires a minimum of time. Also the light source can be easily mounted on the support rod through the closeable opening. The openable translucent panel also makes it very easy to make adjustments to the light source to obtain the desired lighting effect on the subject to be photographed.

FIGS. 7, 8 and 9 show another embodiment of the photographic light diffuser of the present invention. This embodiment of the diffuser 65 is substantially similar in construction and use as the previously discussed diffuser 10. However, dark panels 70 extend beyond the translucent panel 72 positioned in the opening defined by the frame structure 74 of the light diffuser 65. The dark panels are an extension of the reflective panels 73 where the reflective surface has been removed from the interior of the reflective panel. The translucent panel 72 is recessed slightly into the opening defined by the frame structure 74 so that the dark panel 70 formed in the reflective panel 73 extend beyond the translucent panel 72. Normally, the translucent panel is inset from the ends of the ribs 76 of the frame structure 74, a distance that is about from 2% to about 10% of the length of the support rod 78 for the light diffuser 65.

It is also possible to attach the dark panels as moveable separate pieces to the ends of the ribs 76 of the frame structure 74 as shown in FIG. 9. In this construction the dark panel 70 would extend beyond the ends of the ribs 76 and the translucent panel 72 would be positioned in the opening in the frame structure 74 at the ends of the ribs 76. The dark panels can be pivotally connected to the ribs 76 so that the dark panel 70 can be pivoted towards and away from the translucent panel 72. The dark panels can also be designed to be removably secured to the ends of the ribs 76. Thus, the dark panels could be positioned on the ends of the ribs only when the dark panels were required to produce the desired lighting effect. When separate dark panels are attached to the ends of the ribs 76 these panels can be made of any suitable non-reflective black material. The dark panels can be used to further control the pattern of light that is emitted from the light diffuser 65.

When the dark panels 70 are an extension of the reflective panel 73 positioned on the frame structure 74, the dark panels effectively limit the area of light emitting from the light diffuser 65 to substantially square or rectangular area defined by the panels. When the dark panels are hingedly connected to the ends of the ribs 76 on the frame structure 74, the dark panels can be angled towards and away from the translucent panel 72 to further control the shape of the light emitted from the light diffuser 65. If the dark panels 70 are angled towards the translucent panel 72, this will act to reduce the area of light emitted from the light diffuser. When the dark panels 70 are angled away from the translucent panel 72, this will allow a larger area of light to be emitted from the light diffuser 65. With the moveable dark panels 70, it is possible to use various combinations of angles or positions for the dark panels to produce a desired lighting effect. The light source 82 can be positioned in the interior of the light diffuser 65 to direct light directly through the translucent panel 72 or to direct light against the reflective panel 73 so that the light is reflected and further difussed before passing through the translucent panel 72. In this regard, the light diffuser 65 acts in the same manner as the previously discussed light diffuser 10.

Having described the invention in detail it should be understood that various modifications and substitutions other than those mentioned, can be made in the invention without departing from the scope and spirit of the following claims.

What I claim is:

1. A photographic light diffuser for a light source comprising:
   a support rod having a first end and a second end;
   a frame structure connected to said first end of said support rod, said frame extending radially away from said support rod to form a substantially parabolic structure around said support rod, said frame structure defining an opening around said support rod, said second end of said support rod terminating at substantially said opening defined by said frame structure;
   a cover positioned on said frame structure, said cover having a reflective surface, said cover being positioned on the frame structure so that said reflective surface faces said support rod;
   a translucent panel connected to said cover, said translucent panel being disposed to cover said opening defined by said frame structure, said translucent panel and said cover enclosing said support rod and said frame structure;
   a closeable opening positioned in said cover to provide access to the interior of said light diffuser, said closeable opening allowing said light source to be moveably positioned in the interior of said diffuser, said light source being capable of being directed towards said translucent panel and said light source being capable of being directed towards said reflective panel to produce different levels of diffused light.

2. The photographic light diffuser of claim 1, wherein the frame is collapsible, said frame having an open position that defines said substantially parabolic structure in a closed position, said frame extending along said support rod when said frame is in said closed position.

3. A photographic light diffuser of claim 1, wherein said frame is comprised of a plurality of ribs that are pivotally connected to said first end of said support rod.

4. Photograph light diffuser of claim 3, wherein said frame contains a corresponding plurality of structures, said structures having a first end pivotally connected to each of said ribs and a second end pivotally and slideably connected to said support rod wherein said structures are advanced along said support rod in a direction towards said first end of said support rod to position said frame in said open position.

5. The photographic light diffuser of claim 4, wherein said structures are attached to said ribs at substantially the mid point of said ribs.

6. The photographic light diffuser of claim 4, wherein a runner is slideably positioned on said support rod, said runner receiving said second end of said structures wherein said runner can be advanced along said support rod to move said structures to a position where said frame is in said open position.

7. The photographic light diffuser of claim 6, wherein a releasable lock mechanism is positioned on said support rod, said lock mechanism being disposed to secure said runner and said second end of said structure is in a position to maintain said frame in said open position.

8. The photographic light diffuser of claim 1, wherein said closeable opening positioned in said cover extends substantially from said first end of said support rod to said opening defined by said frame.

9. The photographic light diffuser of claim 1, wherein said closeable opening is disposed to be substantially parallel to the support rod.

10. The photographic light diffuser of claim 1, wherein said opening defined by said frame structure is substantially square.

11. The photographic light diffuser of claim 10, wherein said translucent panel is removeably secured to said cover.

12. The photographic light diffuser of claim 11, wherein said translucent panel is secured to said cover by a velcro seal that releasably joins the edge of said translucent panel to the edges of said cover that is positioned adjacent the opening defined by said frame structure.

13. The photographic light diffuser of claim 12, wherein one side of said translucent panel is secured to said cover and said other three sides of said translucent are releasably secured to said cover.

14. The photographic light diffuser of claim 1, wherein said light source positioned within said light diffuser is mounted on said support rod.

15. The photographic light diffuser of claim 14, wherein when said light source within said light diffuser is directed towards said translucent panel said light source emits light primarily in the direction of said translucent panel.

16. The photographic light diffuser of claim 14, wherein when said light source within said light diffuser is directed towards said reflective panel said light source emits light primarily in the direction of said reflective panel whereby said emitted light is reflected off said reflective panel before passing through said translucent panel.

17. The photographic light diffuser of claim 1, wherein said closeable opening in said cover is disposed for receiving a support rod of a floor stand for mounting said light diffuser in an elevated position.

18. The photographic light diffuser of claim 1, wherein said translucent panel is made from a white nylon fabric.

19. The photographic light diffuser of claim 1, wherein said reflective panel has a reflective silver colored interior and a black exterior.

20. The photographic light diffuser of claim 1, wherein moveable dark panels extend beyond said translucent panel positioned in said opening defined by said frame structure, said moveable panels being disposed to alter the panel of light emitted from said translucent panel that extends across said opening in said frame structure.

21. The photographic light diffuser of claim 1, wherein said translucent panel is inset from said opening defined by said frame structure a distance that is from about 2% to about 10% of the length of said support rod, said cover extending beyond said translucent panel along said support structure, said portion of said cover that extends beyond said translucent panel being comprised of non-reflective black material and forming panels that alter the pattern of the light emitted from said translucent panel.

22. A photographic light diffuser for a light source comprising:
   a support rod having a first end and a second end;
   a collapsible frame connected to said first end of said support rod, said frame having a collapsed position and an open position; said frame extending from said first end along said support rod towards said second end when said frame is in said collapsed position, said frame extending radially away from said support rod to form a substantially parabolic frame defining a substantially square opening around said support rod when said frame is in said open position, said second end of said support rod terminating at said substantially square opening of said substantially parabolic frame;
   a cover including a translucent fabric panel and a reflective fabric panel, said reflective fabric panel being positioned on said collapsible frame, said reflective panel substantially covering said substantially parabolic frame when said frame is in said open position and collapsing with said frame along said support rod when said frame is in said collapsed position, said translucent panel of fabric being disposed to cover said substantially square opening defined by said frame, said translucent panel being joined to said reflective panel at said substantially square opening to enclose said support rod, said reflective fabric having a reflective interior surface that faces said support rod and a black outer surface;
   a closeable opening positioned in said reflective panel of said cover to provide access to the interior of the light diffuser, said closeable opening allowing said light source to be moveably positioned in the interior of said diffuser, said light source being capable of being directed towards said translucent panel and said light source being capable of being directed towards said reflective panel to produce different levels of diffused light.

23. The photographic light diffuser of claim 22, wherein said collapsible frame is comprised of a plurality of ribs that are pivotally connected to said first end of said support rod.

24. The photographic light diffuser of claim 23, wherein said frame contains a corresponding plurality of stretchers, said stretchers having a first end pivotally connected to each of said ribs and a second end pivotally and slideably connected to said support rod wherein said stretchers are advanced along said support rod in a direction towards said first end of said support rod to position said collapsible frame in said open position.

25. The photographic light diffuser of claim 24, wherein said stretchers are attached to said ribs at substantially the mid point of said ribs.

26. The photographic light diffuser of claim 24, wherein a runner is slideably positioned on said support rod, said runner receiving said second end of said stretchers whereby said runner can be advanced along said support rod to move said stretchers to a position where said collapsible frame is in said open position.

27. The photographic light diffuser of claim 22, wherein said translucent panel is removably secured to said reflective panel on at least three sides of said substantially square opening, said translucent panel being removably secured to said reflective panel by a velcro type seal.

28. The photographic light diffuser of claim 22, wherein said closeable opening located in said reflective panel extends substantially from said first end of said support rod to said square opening defined by said frame.

29. The photographic light diffuser of claim 28, wherein said closeable opening in said reflective panel includes a zipper-type seal for releasably joining the edges of said reflective panel that define said opening whereby said opening can be reusably opened and closed.

30. The photographic light diffuser of claim 22 wherein said light source positioned within said light diffuser is mounted to said support rod.

31. The photographic light diffuser of claim 22, wherein when said light source within said light diffuser is directed towards said translucent panel said light source emits light primarily in the direction of said translucent fabric panel.

32. The photographic light diffuser of claim 22, wherein when said light source within said light diffuser is directed towards said reflective panel said light source emits light primarily in the direction of said reflective panel whereby said emitted light is reflectied off said reflective panel before passing through said translucent fabric panel.

33. The photographic light diffuser of claim 22, wherein said light source is positioned within said light diffuser such that said light source directs light in the direction of said reflective panel and said translucent panel.

34. The photographic light diffuser of claim 22, wherein said translucent fabric panel comprises white nylon.

35. A photographic light diffuser for a light source comprising:

a support rod having a first end and a second end;

a collapsible frame connected to said first end of said support rod; said frame having a collapsed position and an open position; said frame extending from said first end along said support rod towards said second end when said frame is in said collapsed position, said frame extending radially away from said support rod to form a substantially parabolic frame defining a substantially square opening around said support rod when said frame is in said open position, said second end of said support rod terminating at said substantially square opening of said substantially parabolic frame;

said collapsible frame having a plurality of ribs pivotally connected to said first end of said support rod;

said collapsible frame having a corresponding plurality of stretchers, said stretchers having a first end pivotally connected to substantially the mid points of said ribs and a second end pivotally connected to a runner slideably positioned on said support rod whereby said runner can be advanced along said support rod to move said stretchers to a position where said collapsible frame is in said open position;

a releasable lock mechanism positioned in said support rod, said lock mechanism being disposed to secure said runner and said second ends of said stretchers in a position to maintain said collapsible frame in said open position;

a cover including a translucent fabric panel and a reflective fabric panel, said reflective fabric panel being positioned on said collapsible frame, said reflective panel substantially covering said substantially parabolic frame when said frame is in said open position and collapsing with said frame along said support rod when said frame is in said collapsed position, said translucent fabric panel being disposed to cover said substantially square opening defined by said frame, said translucent panel being secured to one side of said reflective panel and releasably joined to three sides of said reflective panel at said substantially square opening to enclose said support rod, said reflective fabric panel having a reflective interior surface that faces said support rod and a black outer surface, said translucent panel being made of a white nylon;

a closeable opening positioned in said reflective panel of said cover to provide access to the interior of said light diffuser, said closeable opening including a zipper closure for releasably joining the edges of said cover that define said opening whereby said opening can be reuseably opened and closed, said closeable opening allowing said light source to be moveably positioned in the interior of said diffuser, said light source being capable of being directed towards said translucent panel and said light source being capable of being directed towards said reflective panel to produce different levels of diffused light.

* * * * *